United States Patent [19]
Hijiya et al.

[11] 3,784,390
[45] Jan. 8, 1974

[54] SHAPED BODIES OF PULLULAN AND THEIR USE

[75] Inventors: Hiromi Hijiya; Makoto Shiosaka, both of Okayama, Japan

[73] Assignee: Hayashibara Biochemical Laboratories, Incorporated, Okayama-ken, Japan

[22] Filed: July 13, 1972

[21] Appl. No.: 271,378

[30] Foreign Application Priority Data
July 23, 1971  Japan.............................. 46/54579
Oct. 30, 1971  Japan.............................. 46/85960

[52] U.S. Cl............. 106/139, 106/213, 260/17.4 ST
[51] Int. Cl. ......................... C08h 1/00, C08h 7/00
[58] Field of Search.................... 106/139, 162, 213; 260/17.4; 195/31 P

[56] References Cited
UNITED STATES PATENTS
3,054,689   9/1962   Jeans ................................ 106/208
3,406,114   10/1968  Goren ............................... 195/31 P Primary Examiner—Theodore Morris
Attorney—Hans Berman and Kurt Kelman

[57] ABSTRACT

Pullulan, a water-soluble polysaccharide produced by Pullularia pullulans from conventional culture media and consisting of repeating units of maltotriose linked by $\alpha$-1,6 bonds, can be shaped by compression molding or extrusion at elevated temperature or by evaporation of water from its aqueous solutions to form shaped bodies, such as films or coatings which are practically impermeable to atmospheric oxygen in thin layers and unaffected by oils and fats so as to provide valuable packing materials for food, pharmaceuticals, and other oxygen sensitive materials. Pullulan is edible and biodegradable.

14 Claims, No Drawings

SHAPED BODIES OF PULLULAN AND THEIR USE

This invention relates to pullulan, and particularly to shaped bodies of pullulan and to their use.

Pullulan is a polysaccharide consisting of maltotriose units linked by $\alpha$-1,6 bonds. As disclosed by H. Bender et al (Biochim. Biophys. Acta 36 [1959] 309) and S. Ueda, (Kogyo Kagaku Zasshi 67 [1964] 757), pullulan is produced by strains of Pullularia or Dematium growing on conventional culture media, and is readily recovered from a culture medium because of its insolubility in methanol. While the material has been known for a relatively long period, it did not find any practical application heretofore.

It has now been found that pullulan is readily converted into shaped bodies having valuable properties. The material is water soluble, edible, and biodegradable. It can be converted to shaped bodies by dissolving it in water, imparting to the aqueous solution a desired shape, and then removing all or most of the water. Films are thus prepared by casting an aqueous pullulan solution on a flat, horizontal substrate, and evaporating the water. Other thin-walled shapes having dimensions of length and width which are many times greater than the thickness of the body are produced in an analogous, essentially conventional manner. Pullulan is pseudothermoplastic and may thus be compression molded or extruded at elevated temperature.

Films and sheets of pullulan are transparent and colorless, and free surfaces formed by evaporation of water from a pullulan solution have a high gloss. The tensile strength of shaped bodies of pullulan is of the same order of magnitude as that of regenerated cellulose (Cellophane) and may be higher at low moisture content. Films and sheets of pullulan are pliable and have high folding endurance. The mechanical and optical properties of the material are not impaired by aging and storage at very high or very low relative humidity. Although the material is soluble even in cold water, it does not become tacky when exposed to a moist atmosphere. It does not become brittle at temperatures as low as $-10°C$. It is not affected by oil and insoluble in many common organic solvents. It does not retain charges of static electricity and does not readily support the growth of microorganisms.

Even very thin films of pullulan are almost impermeable to atmospheric oxygen. The material is relatively permeable to water vapor.

As is inherent in the above list of properties, pullulan films, coatings, sheets, and the like are valuable packaging materials, particularly for materials that need to be protected against atmospheric oxygen. If protection against atmospheric moisture is also required, it can readily be provided by a secondary envelope of other available polymers such as polyethylene. Conforming coatings of pullulan are prepared by spraying the object to be protected with an aqueous solution of pullulan an by thereafter evaporating or otherwise removing the water. As will be shown hereinbelow, a frozen envelope prepared by quickly cooling an aqueous pullulan solution has properties closely similar to those of a sheet of substantially water-free pullulan.

Pullulan is compatible with other water-soluble, film-forming polymers, such as amylose, polyvinyl alcohol, and gelatin, and shaped bodies consisting of mixtures of pullulan with such other film-forming ingredients are prepared in the same manner as the afore-described pullulan bodies, that is, by compression molding of a particulate, intimate mixture of the ingredients, or by evaporation of water from a common aqueous solution. The valuable properties of pullulan are retained to an important extent if the mixtures do not contain more than 120 percent amylose, 100 percent polyvinyl alcohol, and/or 150 percent gelatin, based on the weight of the pullulan in the mixture. The effects of the additional film-forming ingredients on the mechanical, optical, and physical properties of pullulan will be illustrated hereinbelow by specific examples.

Bodies consisting essentially of pullulan or of mixtures of pullulan with amylose, polyvinyl alcohol, and/or gelatin may be plasticized by means of polyhydric alcohols. While any polyhydric alcohol is effective as a plasticizer for shaped bodies of pullulan or its aforedescribed mixtures, maltitol, sorbitol, and glycerol have been found most effective. Water-soluble grades of polyvinyl alcohol also act as plasticizers. The amounts of plasticizer employed depend on the nature of the polymeric ingredients, on the result that it is desired to achieve, and on the nature of the plasticizer. Generally, no significant change in properties is observed with less than 1 percent of plasticizer, based on the weight of the shaped body, and some of the desirable properties of pullulan are lost when the plasticizer concentration exceeds 20 percent of the body weight unless relatively large amounts of gelatin are present.

Films and coatings of pullulan are superior to amylose films in their resistance to aging, in their optical properties, in their impermeability to oxygen, and in their ability of dissolving in water quickly and without leaving a trace. Typically, a pullulan film up to a thickness of 0.2 mm vanishes in contact with water at 30°C within a fraction of a minute, and the dissolution rate increases with the water temperature. It is not materially reduced by admixture of the film-forming materials mentioned above in the amounts specified.

The degree of polymerization and molecular weight of pullulan vary with the specific strain of Pullularia employed in preparing the polysaccharide. Pullulan having a molecular weight of about 250,000 has been found to produce shaped bodies of most desirable mechanical strength while producing aqueous solutions of relatively high viscosity. Some mechanical strength is lost in pullulans of lower molecular weight, such as 50,000, but more concentrated aqueous solutions are readily prepared. The aqueous solutions employed in making films and other predominantly two-dimensional shapes of pullulan preferably contain 3 percent to 10 percent of the material, and they may additionally contain amylose, polyvinyl alcohol, and/or gelatin.

Relatively concentrated solutions of pullulan are prepared most conveniently from pullulan recovered from a culture medium without drying. Such wet pullulan readily disperses in hot water. Thoroughly dried pullulan in pieces of substantial thickness may require a temperature as high as 120°C or even more to dissolve within a short time.

Films may be cast from aqueous solutions containing 5 percent pullulan of molecular weight 250,000 on smooth glass or metal plates in a conventional manner, and the viscosity of the casting solution may be adjusted by varying the concentration and/or temperature for producing films of desired dry thickness. The fluid coating initially cast may be dried by a stream of hot air whose temperature is not critical. No turbidity is caused even at relatively high air temperature. The viscous pullulan solutions tend to entrap air in minute bubbles, and such bubbles must be removed by applying a vacuum to the casting solution if a very thin film free from pinholes and visible blemishes is to be produced.

Obviously, other conventional methods of forming films from solutions of film-forming ingredients in volatile solvents are applicable to pullulan and to its mixtures described above. Films having a thickness between 0.01 and 0.2 mm are readily prepared by casting.

A pullulan film 0.1 mm thick typically transmits 95% of incident sunlight, has a tensile strength of 7 – 8 kg/mm$^2$, an elongation of 8 to 20 percent, and a folding endurance of 800 – 900 cycles of double folding. After one month storage at 60 percent relative humidity and 25°C, the tensile strength is unaffected, the elongation may drop to 8 to 11 percent, and the folding endurance to 700 – 750 cycles at 30°C, and to 550 – 600 cycles at −10°C. These values are obviously far superior to those of amylose films, the only other films that are known to be water soluble at least to some extent, oil resistant, and edible.

The oxygen permeability of thin pullulan film is 1 – 2 ml/m$^2$/day at 29° ± 1°C as determined by A.S.T.M. Method D-1434.

The equilibrium moisture content of pullulan films varies relatively little with variations in ambient atmospheric moisture, and the material does not become tacky at relative humidity values as high as 80 percent.

When polyvinyl alcohol is used in a mixture with pullulan as a film-forming agent, it is preferred to choose polyvinyl alcohol having a viscosity of 10 – 27 cps in 4 percent aqueous solution at 20°C, and a saponification value of 87 – 98 percent. Amylose, when mixed with the pullulan, is preferably free, or practically free of amylopectin. Gelatin increases the elastic modulus of pullulan films, and relatively large amounts of gelatin may cause some brittleness which can be overcome by the use of plasticizers, as much as 30 percent plasticizer being advisable and useful in films consisting of pullulan and equal or greater amounts of gelatin. Under other conditions, an amount of plasticizer greater than 20 percent is not conducive to best mechanical properties.

When the water solubility, stability over an extended period of time and over a wide range of temperatures, particularly low temperature, high transparency, high gloss, and nonpermeability to oxygen which are characteristic of pure pullulan films are to be retained to their fullest extent, the combined amount of amylose, polyvinyl alcohol, and gelatin in a film should not exceed 50 percent of the pullulan weight.

Because of their good flexibility at very low temperature and their impermeability to oxygen, the pullulan films and films of pullulan blends are eminently suitable for packaging frozen food. The oil resistance of the films makes them particularly useful for packaging butter, cheese, and other fat-bearing foods. Pharmaceuticals and enzymes which deteriorate in contact with atmospheric oxygen may be stored for extended periods when enveloped in films of pullulan or pullulan blends.

Plates and other shaped bodies such as filaments and fibers can be produced by utilizing the pseudo-thermoplasticity of pullulan. Pure pullulan containing less than about 25% moisture can be compression molded or extruded at 100° – 120°C at pressures of 100 – 150 kg/cm$^2$. The temperature and pressure may have to be modified in the presence of other polymers, such as amylose or polyvinyl alcohol, and in the presence of plasticizers. Pulverulent mixtures of pullulan with amylose and/or polyvinyl alcohol containing 10 percent – 20 percent moisture and not more than 5 percent plasticizer have been molded and extruded successfully.

The fibers or filaments so obtained are of limited direct applicability because of their water solubility. They can be made water resistant in a known manner by treatment with glyoxal or formaldehyde, or by the provision of a waterproof coating.

Cotton dyes are generally absorbed by pullulan, and colored pullulan bodies may be produced from colored aqueous solutions or by molding substantially dry mixtures containing pigments. Pullulan may be used to advantage in textile sizing to reduce the build-up of static electricity on fibers, particularly synthetic fibers, during processing.

The following Examples are further illustrative of the invention, and it will be appreciated that the invention is not limited thereto.

EXAMPLE 1

An aqueous culture medium containing, by weight, 10 percent sucrose, 0.5% $K_2HPO_4$, 0.1% NaCl, 0.02% $MgSO_4 \cdot 7H_2O$, 0.06% $(NH_4)_2SO_4$, and 0.04 percent yeast extract was sterilized 20 minutes at 10 p.s.i. and then cooled. It was inoculated with a loopful of a culture of Dematium pullulans IFO 4464 previeously produced on a 1.5 percent agar medium of otherwise the same composition in one week at 24°C. The inoculated medium was incubated at 27°C for one week with shaking.

The microbial cells were then removed by centrifuging, and the supernatant liquid was mixed with an equal weight of methanol to precipitate the pullulan formed by fermentation. It was whitish and readily recovered by decantation, washed with methanol and dried. It had a mean molecular weight of 250,000 and a specific rotation of $[\alpha]_D^{20} = 195°$. It was identified by its decomposition to maltotriose by pullulanase.

This pullulan will be referred to hereinbelow as pullulan A.

EXAMPLE 2

An aqueous culture medium containing, by weight, 3 percent glucose, 0.12 percent urea, 0.1 percent yeast extract, 0.5% $K_2HPO_4$, and 0.08 percent $MgSO_4 \cdot 7H_2O$ was sterilized as described in Example 1, inoculated with a strain of Pullularia pullulans IFO 6353, and incubated at 27°C for one week with shaking, whereby it was converted to a mucilaginous mass from which the cells were removed and pullulan was precipitated by means of methanol.

The product so obtained had a molecular weight of 60,000 and an optical rotation of $[\alpha]_D^{20} = 171°$. It yielded maltotriose when decomposed by pullulanase and will be referred to hereinbelow as pullulan B. Its lower molecular weight is believed due to amylase produced by the microbial strain employed, and a longer culturing period would have produced pullulan of even lower degree of polymerization.

EXAMPLE 3

Pullulan A was dispersed in Water at 90°C with stirring to produce a 5 percent solution, all percentage values herein being by weight unless specifically stated otherwise. The solution was cooled to 50°C, deaerated by exposure to a vacuum, cast on a clean steel plate in a uniform thickness, and dried in an air stream at 70°C.

The film so obtained had a thickness of 0.02 mm, and was transparent, colorless, glossy, flexible, non-tacky, and tough. Small pieces placed in water at 30°C swelled immediately, disintegrated, and disappeared by dissolution within about 20 seconds.

Its tensile strength was 7.1 kg/mm$^2$, the elongation 10 percent, and it withstood 700 cycles of folding under standardized conditions. No measurable change in elongation and folding endurance was observed after storage for one month at 60 percent relative humidity. Tensile strength improved slightly to 7.2 kg/mm$^2$.

EXAMPLE 4

Pullulan B was dispersed with stirring in hot water for 20 minutes to produce a homogeneous 6 percent solution. 2 percent Maltitol, based on the pullulan weight, was added to the solution with stirring. The solution was deaerated, cast on a clean metal plate at 60°C, and dried in an air stream at 80°C to produce a soft film 0.02 mm thick whose transparency and gloss were very good and only slightly inferior to the film prepared in Example 1, while the film was slightly more readily soluble in water. Its tensile strength was 6.5 kg/mm$^2$, the elongation 21 percent, and it withsood 780 of the folding endurance test cycles. These properties were virtually unaffected by one month storage at 60 percent relative humidity.

An increase in the maltitol concentration to 5 percent decreased the stiffness and toughness of the film while greatly increasing the extensibility. The more plasticized material was found suitable for making soft capsules for pharmaceutical use and for coatings. Closely similar produced were obtained when the maltitol was replaced by equal amounts of glycerol or sorbitol, but some surface smoothness was lost.

EXAMPLE 5

An aqueous 7 percent solution of pullulan A was prepared by stirring the ingredients at 100°C. An aqueous 7 percent suspension of gelatin was heated at 80°C until uniform. Three parts of the pullulan solution and one part of the gelatin solution were mixed, and maltitol and sorbitol were added in amounts of 1 percent each, based on the weight of the film-forming ingredients, pullulan and gelatin. The solution was deaerated, cast on a metal plate at 70°C, and dried in an air stream at 80°C.

The film so produced had a thickness of 0.02 mm, a transparency of 92 percent as compared to 95 percent for that of Example 3, and good gloss. It dissolved in water at 30°C in 20 – 21 seconds, had a relatively high tensile strength of 7.5 kg/mm$^2$ combined with an elongation of 13 percent and a folding endurance of 560 cycles. These properties were not significantly affected by storage for one month at 60 percent relative humidity and 25°C. The oxygen permeability of the film was slightly inferior to the film of Example 3.

EXAMPLE 6

Amylomaize starch hydrolyzed with isoamylase (70 percent amylose content) was heated in water to 130°C for 10 minutes to produce a 5 percent solution. Four parts of a 5 percent solution of pullulan A, prepared as in Example 3, and one part of the amylose solution were mixed while warm, and 1 percent maltitol based on the weight of the film-forming ingredients was added. The solution was deaerated, and a film was formed by quickly drying a cast layer of the solution.

The dry film had a thickness of 0.02 mm. a transparency of 93 percent, and very good gloss. It dissolved in water at 30°C in 20 – 23 seconds, had a tensile strength of 6.8 kg/mm$^2$, an elongation of 15 percent, and a folding endurance of 680 cycles. Its mechanical properties were unaffected by one month storage at 60 relative humidity.

EXAMPLE 7

Gelatinized starch was hydrolyzed and further exposed to isoamylase to produce an amylose of which 50 percent had a degree of polymerization below 50. Respective aqueous 8 percent solutions of pullulan B and of the low D.P. amylose were mixed in a ratio of 10:1 at elevated temperature, and the practically clear mixture was deaerated and cast on a metal plate.

The film produced by drying had a thickness of 0.02 mm, a transparency of 93 percent, good gloss, and dissolved in water at 30°C in the particularly short time of 18 seconds. Its tensile strength of 6.5 kg/mm$^2$ decreased in one month of storage at 60 percent R.H. and 25°C to 6.1 kg/mm$^2$, but elongation and folding endurance were unchanged at 11 percent and 650 cycles respectively.

EXAMPLE 8

A 5 percent solution of pullulan A in hot water was mixed with 15 percent amylose based on the weight of the pullulan. The amylose was prepared by hydrolyzing a liquefied starch solution with iso-amylase, and precipitating the fraction containing more than 50 percent amylose of D.P. 50 or higher. The mixed solution was heated and stirred until uniform, and maltitol and sorbitol were added as plasticizers in respective amounts of 1 percent of the film-forming ingredients. The solution was deaerated, cast on a metal plate, and dried as in the preceding Examples.

The film, having a thickness of 0.02 mm, had a transparency of 93 percent, good gloss and solubility in water at 30°C (20 – 22 seconds), a tensile strength of 6.5 kg/mm$^2$, an elongation of 20 percent, and a folding endurance of 720 cycles. Storage at 60 percent R.H. for one month had no effect on the mechanical properties.

EXAMPLE 9

Polyvinyl alcohol (PVA) having a viscosity of 20 cps and a saponification value of 88 was mixed with an aqueous 4 percent solution of pullulan A in an amount of 30 percent based on the pullulan. A homogeneous solution was formed by heating and stirring. It was deaerated and cast on a metal plate and dried to form a film 0.02 mm thick.

The transparency of the film was 94%, its gloss high, and it dissolved in water at 30°C in 20 – 22 seconds. Its tensile strength of 6.6 kg/mm² and elongation of 16 percent were not significantly affected by storage for one month at 60 percent R.H., but folding endurance increased from 670 to 750 cycles.

Because of its solubility, the intimate mixture of PVA and pullulan was particularly well suited for preparing a coating solution in which nuts were dipped and dried. The coated nuts retained their taste, consistency, and flavor for an extended period of time.

EXAMPLE 10

An aqueous 5 percent solution of pullulan B was mixed with polyvinyl alcohol having a viscosity of 28 cps and a saponification value of 89 in an amount of 10 percent based on the weight of the pullulan B. After the PVA was completely dissolved by heating and stirring, maltitol was added in an amount of 1 percent based on the film-forming ingredients, and the solution was de-aerated and cast on a metal plate.

The film formed after drying had a transparenecy of 94 percent, good gloss, and readily dissolved in warm water. Its tensile strength was 6.5 kg/mm², the elongation 14 percent, and the folding endurance 620 cycles. These properties were unaffected by storage at 60 percent R.H. for one month. The film had particularly low permeability to atmospheric oxygen.

EXAMPLE 11

A solution of 5 percent pullulan A in water was mixed with 20 percent polyvinyl alcohol, based on the pullulan weight, the PVA having a viscosity of 11.8 cps and a saponification value of 98. The film of 0.02 mm prepared from this solution had a transparency of 93 percent, good gloss, and dissolved in water at 30°C within 18 – 20 seconds. Its tensile strength was 6.0 kg/mm², the elongation 13 percent, and the folding endurance 720 cycles. No significant changes in the mechanical properties were observed after storage at 60 percent R.H. for one month.

EXAMPLE 12

An aqueous 5 percent solution of pullulan B was mixed at 80°C with 50 percent water soluble polyvinyl alcohol, based on the pullulan weight, the PVA having a viscosity of 27 cps and a saponification value of 98. An adequately homogeneous solution was produced within three minutes, deaerated, and converted into a film 0.02 mm thick as described in the preceding Examples and having similar properties.

When 2 percent maltitol, based on the weight of the film-forming ingredients, was incorporated in the solution prior to casting, a soft, transparent, glossy film was obtained.

EXAMPLE 13

An intimate and uniform mixture was prepared from four parts, by weight, pullulan powder containing 15 percent moisture and one part gelatin (6 percent moisture), also 0.5 percent maltitol based on the combined weight of pullulan and gelatin. Sheets 3 mm thick were prepared from the mixture at 120°C on a laboratory press. They were white, semi-opaque, and oil resistant, but attackable by the water.

EXAMPLE 14

A pullulan C having a slightly lower molecular weight than pullulan B and lower viscosity was prepared in a manner analogous to Example 2, and could be dissolved in water to form a fluid 10 percent solution. A 10 percent solution of amylose in water was prepared separately from a starch containing 70 percent amylose whose 10 percent solution was gelatinized at 130°C and thereafter hydrolyzed at pH 4 by means of isoamylase derived from Pseudomonas. When the hydrolyzation mixture was cooled, amylose was precipitated and was employed in preparing the hot, aqueous, 10 percent solution of which one part was mixed with three parts of the pullulan C solution. 2 percent Sorbitol, based on the weight of the film-forming ingredients, was added.

The solution so obtained could be sprayed from an air gun for coating fresh food, pharmaceuticals, enzyme particles, dehydrated food and like oxidizable products with a film practically impervious to atmospheric oxygen and sufficiently strong to prevent mechanical damage to the coated articles. Water-soluble capsules for pharmaceutical purposes were formed from the same solution by dipping metal rods having spherically rounded ends in the solution and drying the liquid film formed on the rods withdrawn from the solution in an air stream at 40°C.

EXAMPLE 15

Amylose prepared as described in Example 9 was suspended in an aqueous gelatin solution at 80°C in an amount equal to the weight of the gelatin, and enough wet pullulan B was added to the suspension to make the weight ratio of pullulan, gelatin, and amylose 6:2:2 on a dry basis. The mixture was stirred at 100°C until a homogeneous solution was obtained. Films were prepared by casting the solution on metal plates and removing most of the water present by a stream of air at 50°C.

The films stripped from the metal plates were transparent, smooth, and glossy, and readily dissolved in water. When in moisture equilibrium with ambient air, they were tough and resilient.

EXAMPLE 16

Three parts of an aqueous 7 percent solution of pullulan A and one part of a 20 percent gelatin solution were mixed at 70°C. The mixture, which contained approximately equal weights of pullulan and gelatin, was deaerated, and capsules were prepared by the method described in Example 14.

Capsules were also prepared from a solution of equal parts of pullulan and gelatin which additionally contained 1 percent maltitol, based on the film-forming ingredients. Both batches of capsules had the relatively high modulus of elasticity characteristic of pharmaceutical capsules commonly referred to as "hard" capsules. They were strong enough not be deformed when stacked in a pile. The plasticized capsules showed even greater breaking strength than those prepared from pullulan and gelatin alone.

EXAMPLE 17

Ten g Aliquots of sardine oil, oleic acid, and linoleic acid were adsorbed on equal amounts of diatomaceous earth purified by treatment with aqua regia, and the samples so obtained were packed in identical bags of pullulan film 0.05 mm thick. The bags were sealed in a vacuum and stored at 35°C. The contents of sample bags were extracted with chloroform immediately after sealing, after 3 days of storage, and after 14 days of storage.

The deterioration of the samples by oxidation was determined from optical density readings taken under uniform conditions at 530 m$\mu$ and 450 m$\mu$ TBA (2-thiobarbituric acid)-value initially, after 3 days, and after 14 days, by determining the peroxide value initially and after 3 days and by measuring optical density after 14 days at 420 m$\mu$, a wavelength characteristic of yellowing. The results are tabulated below together with those obtained on controls which were either supported or contained in bags of regenerated cellulose (Cellophane) and polyethylene 0.05 mm thick.

Table 1

TBA-value*

| | Optical Density at 530 m$\mu$ | | | Optical Density at 450 m$\mu$ | | |
|---|---|---|---|---|---|---|
| | Ol.ac. | Lin.ac. | Sard.O. | Ol.ac. | Lin.ac. | Sard.O. |
| Initial | 0.015 | 0.032 | 0.034 | 0.002 | 0.007 | 0.002 |
| After 3 days | | | | | | |
| in pullulan | 0.052 | 0.067 | 0.078 | 0.023 | 0.014 | 0.038 |
| in Celloph. | 0.065 | 0.105 | 0.180 | 0.025 | 0.018 | 0.21 |
| in polyeth. | 0.07 | 0.13 | 0.23 | 0.023 | 0.25 | 0.31 |
| unprotected | 0.07 | 0.2 | 1.925 | 0.023 | 0.985 | 0.54 |
| after 14 days | | | | | | |
| in pullulan | 0.13 | 0.13 | 1.28 | 0.03 | 0.04 | 0.057 |
| in Celloph. | 0.91 | 2.30 | 2.50 | 0.33 | 0.75 | 0.15 |
| in polyeth. | 1.25 | 1.15 | 2.51 | 0.31 | 0.21 | 1.20 |
| unprotected | 2.88 | 2.20 | 4.55 | 0.97 | 0.62 | 1.24 |

*optical density of TBA-value per 0.1 g of fat.

Table 2

| | Peroxide Value, meq/kg | | |
|---|---|---|---|
| | Oleic Acid | Linoleic A. | Sardine Oil |
| Initial | 0.74 | 2.47 | 0.76 |
| After 3 days | | | |
| in pullulan | 2.7 | 5.4 | 7.0 |
| in Cellophane | 3.0 | 6.1 | 51.0 |
| in polyethylene | 4.0 | 56.1 | 70.0 |
| unprotected | 8.0 | 199.5 | 119.0 |

Table 3

| | Yellowing Optical Density at 420 m$\mu$ after 14 Days | | |
|---|---|---|---|
| | Oleic Acid | Linoleic A. | Sardine Oil |
| In pullulan | 0.07 | 0.20 | 0.22 |
| In Cellophane | 0.10 | 0.23 | 0.25 |
| In polyethylene | 0.15 | 0.25 | 0.52 |
| Unprotected | 0.17 | 0.30 | 0.865 |

The results numerically expressed in Table 3 confirm the results of visual inspection. Oleic acid appeared white when stored in pullulan or Cellophane bags, weakly yellow when stored in polyethylene or without protection. Sardine oil was weakly yellow after storage in pullulan bags, more strongly yellow when stored in Cellophane bags, and deeply yellow or brownish when stored in polyethylene or unprotected.

EXAMPLE 18

Five g Samples of bakery yeast were packed in envelopes, 30 mm × 50 mm, of pullulan film 0.05 mm thick, and the envelopes were heat-sealed in a vacuum. Sealed envelopes were sealed in a polyethylene bag for moisture protection and stored in an incubator for one month at 35°C. Controls were sealed in envelopes of polyethylene film and a common polyethylene bag and stored in the same incubator.

The activity of the yeast before and after storage was determined by the amount of carbon dioxide developed from 3 percent sucrose solution. The yeast stored in pullulan retained 92 percent of its initial activity, that stored in polyethylene showed only 40 percent of its initial activity after storage.

Samples of a detergent containing alkaline protease were tested in an analogous manner, and the protease activity was determined in the original material and in the sample stored one month at 35°C in pullulan and polyethylene envelopes respectively. The pullulan envelopes prevented significant loss of protease activity whereas the samples stored in polyethylene were reduced to 60 percent of their original enzymatic activity.

One gram samples of ascorbic acid and of riboflavin were vacuum-sealed in pullulane film envelopes, 20 mm × 30 mm, which were further protected by a polyethylene bag, and controls were enclosed in polyethylene envelopes of equal size and an outer polyethylene bag. After five months of storage at 35°C, the samples of Vitamin C still had 94 percent and those of Vitamin $B_2$ 96 percent of their original activity when stored in pullulan, while the activity of the samples stored in polyethylene had dropped to 31 percent and 45 percent respectively. Oxidation sensitive mechanical compounds are conveniently protected by placing individual doses on a first pullulan sheet in rows and columns, covering the first sheet and the material thereon by a second sheet of pullulan, heat-sealing the two sheets to each other in a rectangular grid of seams between the rows and columns, and then severing the sealed sheets through the seams, thereby producing individual sealed doses. The pullulan envelopes may be ingested together with their contents since they are water-soluble and non-toxic.

EXAMPLE 19

Powdered soup mix was vacuum packed in individual portion amounts in envelopes of pullulan film 0.05 mm thick, and a dozen envelopes were further enclosed in a polyethylene bag for protection against moisture and microbial infestation. Each envelope, when dropped into approximately 8 ozs. of hot water, produced a portion of soup to which the pullulan film contributed neither taste nor odor nor any other perceivable property. After six months of storage under ambient conditions, the pullulan-packed soup was distinctly superior in its flavor and texture to conventionally packaged batches of the same soup mix.

The same beneficial effects of a pullulan envelope were observed with instant Chinese noodles. The mixed ingredients, including "Shiitake," an edible mushroom, vegatables, and shrimps were placed in a flat layer on a pullulan film and then sprayed with a 5% pullulan solution from which the water was removed thereafter by an air stream at 50°C. The laminar sheet so produced was cut into pieces of convenient size which were enclosed in a poyethylene bag, and were ready for cooking when withdrawn from the bag.

EXAMPLE 20

Tabs of butter and of cheese 1 cm × 3 cm × 3 cm were wrapped in pullulan film 0.05 mm thick and stored in a refrigerator at 10°C together with unprotected controls. After one month, no change could be detected in the pullulan-wrapped samples except for slight surface drying of the cheese samples. The unprotected butter samples showed a small, but distinct change in color, increased butyric acid odor, and a significant deterioration in their taste. The perioxide value of the wrapped butter samples was 20.3 meq/kg, that of the unprotected samples 46.5 meq/kg. The unprotected cheese samples showed a small, but clearly discernible deterioration of their taste, odor, and color, and they were dried out.

EXAMPLE 21

Freshly baked doughnuts were sprayed with a pullulan solution, and the coating formed thereby was dried at 60°C for 10 minutes to a thickness varying between 0.05 and 0.1 mm. Several coated doughnuts, uncoated doughnuts in pullulane bags, and uncoated controls were packed in separate polyethylene bags and stored at 35°C for one week. The doughnuts protected by a sprayed coating or a separate bag of pullulan were still in saleable condition, retaining their initial moisture and taste, whereas the controls were distinctly stale.

Pullulan is particularly effective in preventing rancidity of fat in baked or fried goods. Fried crackers and peanuts roasted in butter still had their fresh smell and unchanged taste after 40 days storage under ambient conditions in envelopes of pullulan film 0.03 mm thick, further protected by polyethylene bags, whereas rancidity was obvious in controls packed in two layers of polyethylene.

Fresh mackerel was sprayed with a 4 percent pullulan solution containing 3 percent glycerol based on the weight of the pullulan, and the sprayed fish was transferred immediately to a freezer kept at −20°C. Samples were taken from the coated fish and from an uncoated control after three months storage in which the pullulan solution had formed a frozen, shiny envelope on the fish. The envelope was strong enough to resist manual removal, but disappeared on contact with hot water. The taste of the cooked, pullulan-protected fish was distinctly superior to that of the control, and the peroxide value of the skin of the coated mackerel was significantly lower than the corresponding value determined on the control.

EXAMPLE 22

Freshly baked biscuits were coated with a thin film of pullulan by spraying a 3 percent solution and drying the wet coating. A second batch was enclosed in pullulan bags, and a third batch of the same biscuits was used as a control. Each batch was packed in a polyethylene bag and stored two months at 30°C in a chamber kept at 60 percent relative humidity.

The biscuits protected by pullulan retained their fresh taste whereas some rancidity was noticeable in the controls. The coated samples, moreover, retained their shape during storage and handling while the uncoated biscuits showed evidence of crumbling. The clear pullulan film gave gloss to the coated samples, but was not felt during eating of the biscuits.

EXAMPLE 23

Hams and sausages were steam-heated in water-soluble casings and molded, whereupon the casings were removed. The batch was divided into two portions of which one was uniformly sprayed with warm 5 percent pullulan solution to produce a film which had a thickness of about 0.05 mm after drying in an air stream at 70°C. The coated hams and sausages together with the unprotected controls were stored at 5°C for three months which did not cause cracks or turbidity in the pullulan films on the coated pieces.

The aldehyde content of the coated samples and the controls was measured by the TBA method, and only one-third to one-fifth of the aldehyde content of the controls was found in the coated material which is indicative of the oxidation protection afforded by the thin pullulan film.

EXAMPLE 24

Freshly harvested spinach was sliced and freeze-dried at −20°C. Samples of the product were placed on a metal plate in a vacuum drier at 30°C and 180 mm Hg and sprayed with a pullulan solution so that the dried spinach and the plate were enveloped by a film of pullulan. The coated spinach was further protected by being sealed in a polyethylene bag. When reconstituted after five months, the sinach was indistinguishable in color, shape, odor, and flavor from spinach reconstituted immediately after freeze-drying.

Alternatively, fresh spinach was cut into slices and sprayed with a 3 percent pullulan solution. It was then freeze-dried while still wet, and sealed in a polyethylene bag. The appearance, taste, and odor of the spinach when reconstituted five months later was not different from that of spinach reconstituted immediately after freeze-drying. The vitamin loss in storage was only 10 percent.

EXAMPLE 25

Beef sliced to a thickness of 5 to 10 mm was seasoned, and roasted. The roasted slices were sprayed with hot 7 percent pullulan solution to a thickness sufficient to produce a film without pinholes, and the coated slices were immediately freeze-dried. Control slices were freeze-dried as roasted. Samples of the coated slices and the controls were stored for 50 days in each of two incubators respectively kept at 35° and 65°C.

Samples were withdrawn at 10 day intervals and analyzed for oxidation of the fat content by determination of acid value, peroxide value, and aldehyde content, the latter being determined by measuring the optical density according to the TBA method. Extracts of the fat were prepared by grinding a 10 g sample in a mortar and triturating the ground sample with 200 g of a 2:1

(volume) mixture of chloroform and methanol. The extract was dried and evaporated at 35°C in a vacuum. The moisture content of the freeze-dried, coated samples was 4 – 7 percent, that of the uncoated controls 2 – 4 percent. The results of the tests on products stored at 35° and 65°C respectively are listed in Tables 4 and 5.

Table 4 (35°C)

| Sampled after | 0 | 10 | 20 | 30 | 50 days |
|---|---|---|---|---|---|
| Acid value in | | | | | |
| coated slices | 3.2 | 3.8 | 4.5 | 5.7 | 6.1 |
| uncoated | 3.3 | 5.5 | 8.9 | 11.1 | 15.8 |
| Peroxide value in | | | | | |
| coated slices | 15.2 | 16.0 | 15.7 | 16.1 | 20.2 |
| uncoated | 14.3 | 17.0 | 21.0 | 21.5 | 39.9 |
| Aldehyde in (TBA-value) | | | | | |
| coated slices | 0.13 | 0.21 | 0.35 | 0.75 | 0.78 |
| uncoated | 0.18 | 1.36 | 1.58 | 1.75 | 2.00 |

Table 5 (65°C)

| Sampled after | 0 | 10 | 20 | 30 | 50 days |
|---|---|---|---|---|---|
| Acid value in | | | | | |
| coated slices | 3.3 | 3.6 | 4.5 | 8.1 | 11.3 |
| uncoated | 3.8 | 8.3 | 19.5 | 33.1 | 45.5 |
| Peroxide value in | | | | | |
| coated slices | 17.3 | 150.1 | 320.0 | 350.0 | 210 |
| uncoated | 20.1 | 420.1 | 730 | 410.5 | 166 |
| Aldehyde in (TBA-value) | | | | | |
| coated slices | 0.50 | 1.10 | 1.50 | 1.85 | 2.47 |
| uncoated | 0.60 | 1.50 | 1.92 | 2.75 | 3.64 |

The numerical values listed in Tables 4 and 5 were confirmed by subjective tests. Samples were heated in an electronic oven together with 10 percent water and permitted to stand for ten minutes. They were then tasted. The pullulan coatings were dissolved in the hot water, and the samples protected by a pullulan film during storage were found to be consistently superior to the uncoated slices in flavor and taste.

While the invention has been described by reference to specific embodiments, it should be understood that it is not limited to the specific examples chosen for the purpose of the disclosure, but is to be construed broadly and limited solely by the scope and spirit of the appended claims.

What is claimed is:

1. A shaped solid body consisting essentially of a uniform mixture of pullulan with at least one member of the group consisting of amylose, polyvinyl alcohol, and gelatin, the amount of said amylose being not greater than 120 percent of the weight of said pullulan, the amount of said polyvinyl alcohol being not greater than 100 percent of the weight of said pullulan, and the amount of said gelatin being not greater than 150 percent of the weight of said pullulan, said pullulan having a molecular weight of approximately 50,000 to approximately 250,000, and being a polysaccharide essentially consisting of maltotriose units linked by $\alpha$-1,6-bonds.

2. A body as set forth in claim 1, further containing an amount of a polyhydric alcohol sufficient to plasticize said mixture.

3. A body as set forth in claim 2, wherein said polyhydric alcohol is glycerol, sorbitol, or maltitol.

4. A body as set forth in claim 3, wherein said polyhydric alcohol constitutes 1 percent to 20 percent of the weight of said body.

5. A body as set forth in claim 1 having dimensions of length and width many times greater than the thickness thereof.

6. A method of making the body set forth in claim 1 which comprises dissolving said pullulan and said at least one member in water, imparting a shape to the aqueous solution so produced, and substantially removing the water from said solution.

7. A method of making the body set forth in claim 1 which comprises shaping said mixture above the softening temperature thereof under applied pressure.

8. A body as set forth in claim 1, wherein said pullulan is a product of fermentation by means of Pullularia pullulans or Dematium pullulans.

9. A shaped solid body consisting essentially of pullulan and an amount of a polyhydric alcohol sufficient to plasticize said pullulan, said pullulan being a polysaccharide essentially consisting of maltotriose units linked by $\alpha$-1,6-bonds and having a molecular weight of approximately 50,000 to approximately 250,000.

10. A body as set forth in claim 9, which has a transparency of more than 90 percent in a thickness of 0.1 mm, a tensile strength not substantially smaller than 6.0 kg/mm$^2$, and an elongation of at least 8 percent after storage for one month at 60 percent relative humidity and 25°C.

11. A body as set forth in claim 9, wherein said pullulan is a product of fermentation by means of Pullularia pullulans or Dematium pullulans.

12. A body as set forth in claim 9, wherein said polyhydric alcohol is glycerol, sorbitol, or maltitol in an amount constituting 1 percent to 20 percent of the weight of said body.

13. A method of making the body set forth in claim 9, which comprises dissolving said pullulan and said alcohol in water, imparting a shape to the aqueous solution so produced, and substantially removing the water from the shaped solution.

14. A method of making a shaped body essentially consisting of pullulan which comprises shaping said pullulan above the softening temperature thereof under applied pressure, said pullulan having a molecular weight of approximately 50,000 to approximately 250,000 and being a polysaccharide essentially consisting of maltotriose units linked by $\alpha$-1,6 bonds.

* * * * *